United States Patent
Bowers et al.

(10) Patent No.: US 9,168,963 B2
(45) Date of Patent: Oct. 27, 2015

(54) SYSTEMS AND METHODS EMPLOYING LIMBED VEHICLE AND SPACED POSTS

(75) Inventors: Jeffrey A. Bowers, Kirkland, WA (US); Roderick A. Hyde, Redmond, WA (US); Muriel Y. Ishikawa, Livermore, CA (US); Jordin T. Kare, Seattle, WA (US); Clarence T. Tegreene, Bellevue, WA (US); Lowell L. Wood, Bellevue, WA (US); Victoria Y.H. Wood, Livermore, CA (US)

(73) Assignee: The Invention Science Fund I, LLC, Bellevue, WA (US)

(*) Notice: Subject to any disclaimer, the term of this patent is extended or adjusted under 35 U.S.C. 154(b) by 2063 days.

(21) Appl. No.: 12/006,079

(22) Filed: Dec. 28, 2007

(65) Prior Publication Data
US 2009/0166104 A1 Jul. 2, 2009

(51) Int. Cl.
*B62D 57/032* (2006.01)
*A01B 51/02* (2006.01)

(52) U.S. Cl.
CPC .............. *B62D 57/032* (2013.01); *A01B 51/02* (2013.01)

(58) Field of Classification Search
CPC ............................. B62D 57/032; A01B 51/02
USPC ........................................ 180/8.1, 8.6; 901/1
See application file for complete search history.

(56) References Cited

U.S. PATENT DOCUMENTS

| | | | |
|---|---|---|---|
| 4,565,487 A | 1/1986 | Kroczynski | |
| 4,585,388 A * | 4/1986 | Gossain et al. | 414/735 |
| 4,612,996 A * | 9/1986 | Wolf et al. | 172/26 |
| 4,637,494 A | 1/1987 | Iida et al. | |
| 4,738,583 A * | 4/1988 | Macconochie et al. | 414/735 |
| 5,213,172 A | 5/1993 | Paris | |
| 5,248,923 A * | 9/1993 | Kimura et al. | 318/568.2 |
| 6,671,582 B1 | 12/2003 | Hanley | |
| 6,848,856 B2 * | 2/2005 | Johnson | 404/6 |
| 7,327,112 B1 | 2/2008 | Hlynka et al. | |
| 2004/0236467 A1 * | 11/2004 | Sano | 700/245 |
| 2005/0228539 A1 | 10/2005 | Takenaka et al. | |
| 2006/0076167 A1 | 4/2006 | Setrakian et al. | |

FOREIGN PATENT DOCUMENTS

JP 61-75075 4/1986

OTHER PUBLICATIONS

U.S. Appl. No. 12/006,052, Bowers et al.
U.S. Appl. No. 12/006,081, Bowers et al.
Balaguer et al.; "A climbing autonomous robot for inspection applications in 3D complex environments"; Robotica; May 2000; pp. 287-297; vol. 18, Issue 03; Cambridge Journals.

* cited by examiner

*Primary Examiner* — Joseph Rocca
*Assistant Examiner* — Jacob Knutson

(57) ABSTRACT

Embodiments disclosed herein relate to systems including a limbed vehicle having a plurality of controllably movable limbs (e.g., a limbed machine, limbed robot, etc.) and a plurality of spaced posts that the limbed vehicle may travel on using the limbs. As non-limiting examples, such disclosed embodiments of systems may be used to service an agriculture field, to enable travel over an environmentally-sensitive area or an area impassable by a conventional wheeled or tracked vehicle, and may be used in many other different applications. Embodiments disclosed herein also relate to methods of operating a limbed vehicle to travel on a plurality of spaced posts.

43 Claims, 16 Drawing Sheets

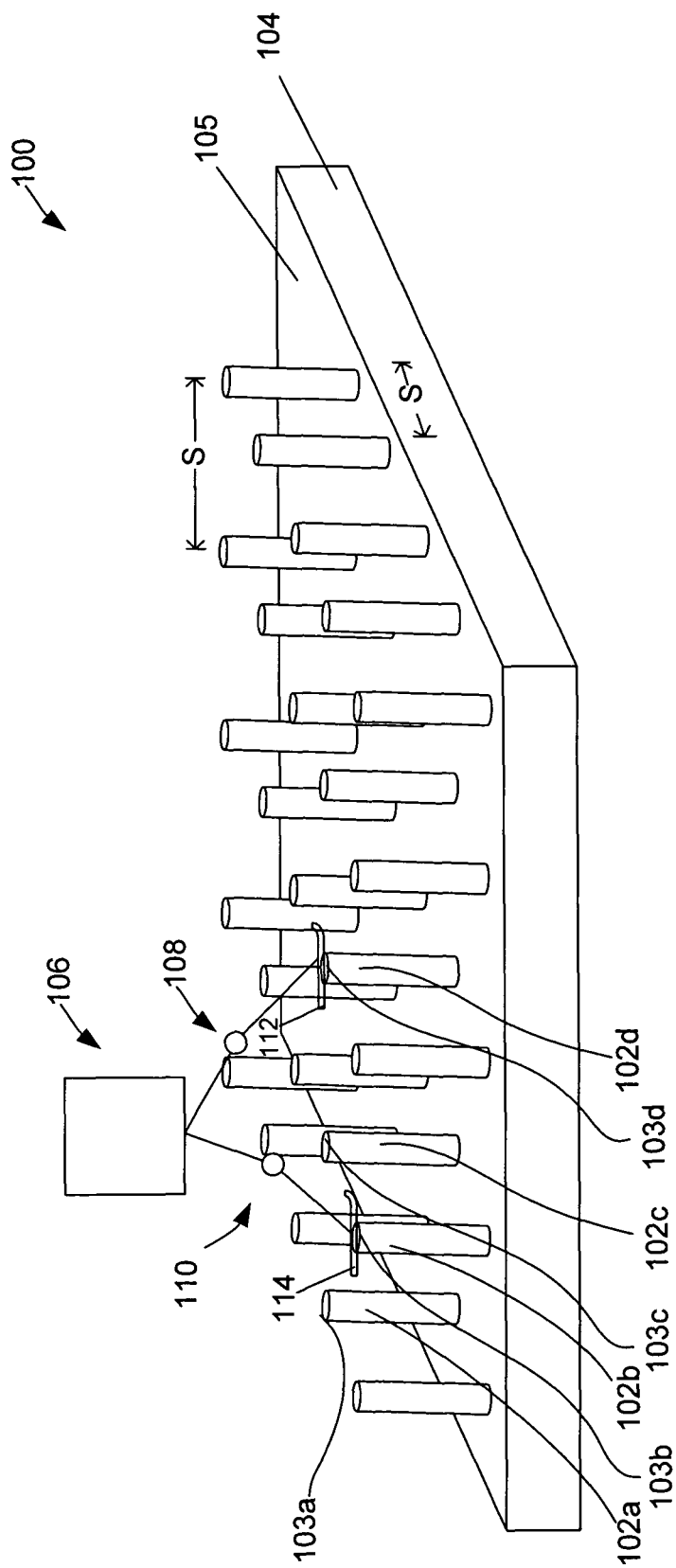

SYSTEMS AND METHODS EMPLOYING LIMBED VEHICLE AND SPACED POSTS

CROSS-REFERENCE TO RELATED APPLICATIONS

The present application is related to U.S. patent application Ser. No. 12/006,081 entitled LIMBED VEHICLES, SYSTEMS AND METHODS USING SAME, AND POST NETWORKS ON WHICH LIMBED VEHICLES TRAVEL, naming Jeffrey A. Bowers, Roderick A. Hyde, Muriel Y. Ishikawa, Jordin T. Kare, Clarence T. Tegreene, Lowell L. Wood Jr., and Victoria Y. H. Wood as inventors, filed on Dec. 28, 2007.

The present application is related to U.S. patent application Ser. No. 12/006,052 entitled LIMBED VEHICLES, SYSTEMS AND METHODS USING SAME, AND POST NETWORKS ON WHICH LIMBED VEHICLES TRAVEL, naming Jeffrey A. Bowers, Roderick A. Hyde, Muriel Y. Ishikawa, Jordin T. Kare, Clarence T. Tegreene, Lowell L. Wood Jr. and Victoria Y. H. Wood as inventors filed on Dec. 28, 2007.

SUMMARY

According to one embodiment, a system includes, but is not limited to, a plurality of spaced posts and a limbed vehicle having a plurality of controllably movable limbs. The limbed vehicle is configured to travel on the posts using the controllably movable limbs.

According to another embodiment, a method of operating such a system includes, but is not limited to, directing a limbed vehicle to be supported on at least one post of a plurality of spaced posts using at least one limb of the limbed vehicle. The method further includes, but is not limited to, directing the limbed vehicle to travel onto at least one additional post of the plurality of spaced posts.

The foregoing is a summary and thus contains, by necessity, simplifications, generalizations and omissions of detail. Consequently, those skilled in the art will appreciate that the summary is illustrative only and is NOT intended to be in any way limiting. Other aspects, features, and advantages of the systems or methods described herein, as defined by the claims, will become apparent in the detailed description set forth herein.

BRIEF DESCRIPTION OF THE DRAWINGS

FIG. 1B is a schematic perspective view of the system shown in FIG. 1A, with the limbed vehicle having moved to be supported by different posts.

DETAILED DESCRIPTION

Figure 1A:
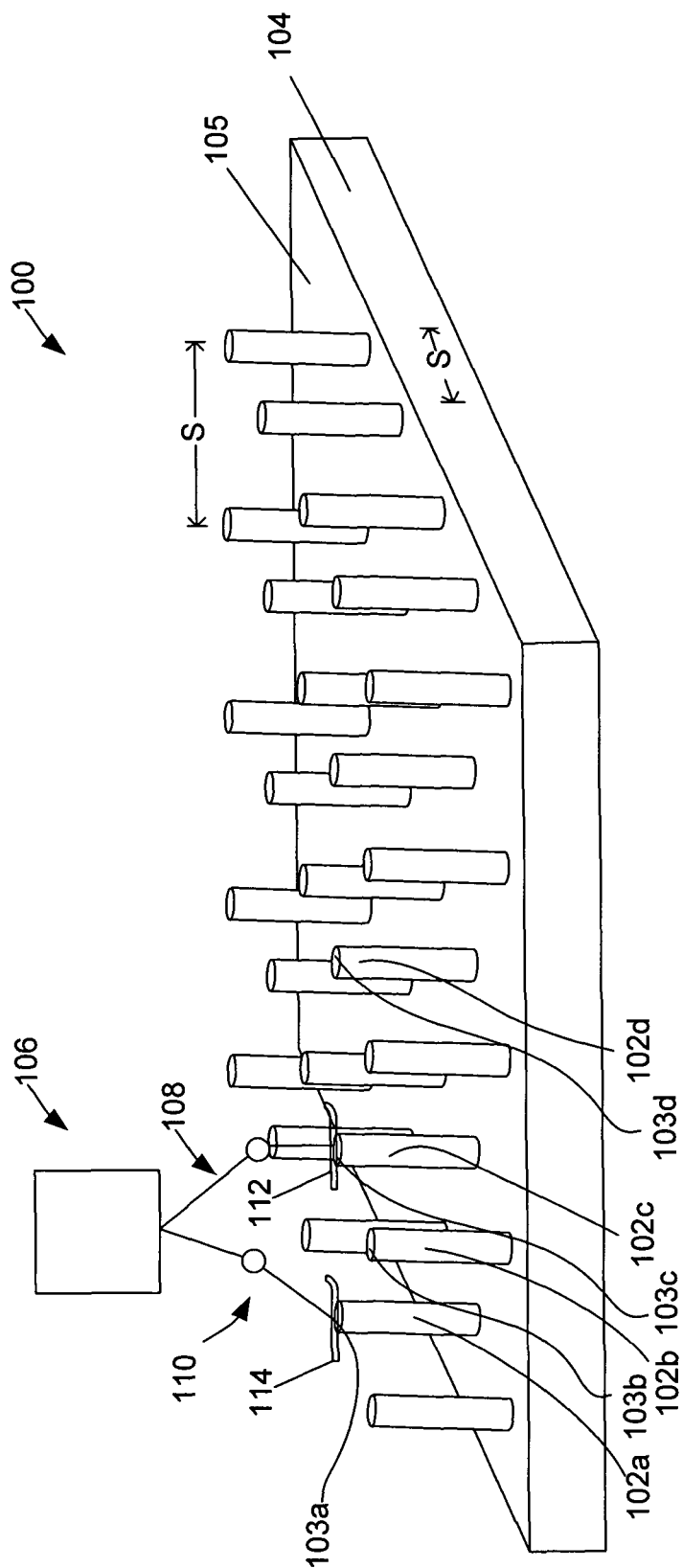
FIG. 1A is a schematic perspective view of one embodiment of a system that includes a plurality of spaced posts distributed over a surface and a limbed vehicle configured to travel on the posts.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein.

Embodiments disclosed herein are directed to systems including a limbed vehicle having a plurality of limbs (e.g., a limbed machine, limbed robot, etc.) and a plurality of spaced posts on which the limbed vehicle may travel using the limbs. As non-limiting examples, such disclosed embodiments of systems may be used to service an agriculture field, to travel over an environmentally-sensitive area, to travel over an area impassable by a conventional wheeled or tracked vehicle, or in many other different applications. Embodiments disclosed herein are also directed to methods of directing a limbed vehicle to travel on a plurality of spaced posts. As used herein, phrases such as "travel on a plurality of posts" or similar phrases such as "a plurality of posts on which the limbed vehicle travels" include, but are not limited to, the limbed vehicle making contact with the posts at a distal end of the post as well as making contact with any other portion of a post, including a side of a post.

FIG. 1A is schematic perspective view of a system 100 according to one embodiment. The system 100 includes a plurality of spaced posts 102 (only posts 102a-102d are labeled in FIG. 1A for simplicity) that may be at least partially disposed within a medium 104 (for example, and not limited to, the ground) having a surface 105. At least one post 102 may be a solid, elongated member, a generally tubular member, or another structural member having any suitable configuration. For example, the posts 102 may be fabricated from polyvinyl chloride ("PVC"), steel, aluminum, composite materials, or another suitable structural material.

Posts 102 may be at least partially embedded within the medium 104 and may project outwardly from, beyond, or above the surface 105, and further may be spaced from an adjacent post 102 by a post spacing S. However, in some applications the spacing between adjacent posts 102 may not be uniform and the spacing may be tailored for specific types of applications. As will be described in more detail below, at least one post 102 includes a limb-interfacing surface 103 (only limb-interfacing surfaces 103a-103d are labeled in FIG. 1A for simplicity) suitably configured to interface with a limbed vehicle 106. Although FIG. 1A shows respective posts 102 extending above the surface 105 about the same distance, in any of the embodiments disclosed herein, at least some of the posts 102 may extend above the surface 105 different distances. For example, respective posts 102 may have different lengths or may be driven into the medium 104 to different depths. Furthermore, in any of the embodiments disclosed herein, at least one, some, or all of the limb-interfacing surfaces 103 may be located substantially at or recessed below the surface 105 of the medium 104.

Installation of at least one post 102 may be performed by drilling a corresponding borehole in the medium 104 with, for example, a directional boring machine, and emplacing the post 102 into the corresponding borehole. In another embodiment, a mechanized post-driving machine may be used to emplace at least one post 102 into the medium 104. For example, such mechanized post-driving machines may be pneumatically or hydraulically actuated to drive a post 102 into medium 104 and are commercially available from a variety of different companies. For example, pneumatic post drivers are commercially available from Rohrer Manufacturing of Powell Butte, Oreg. However, other techniques may be employed to emplace a post 102 in the medium 104. In some embodiments, one or more of the posts 102 may be mechanically coupled to a support structure that is at least partially embedded in the medium 104. In such an embodiment, the one or more of the posts 102 mechanically coupled to the support structure may also be at least partially embedded in the medium 104 or may not be embedded in the medium 104.

Still referring to FIG. 1A, the limbed vehicle 106 of the system 100 is configured to travel on the posts 102 and over the medium 104. The limbed vehicle 106 includes a plurality of controllably movable limbs depicted in the FIGS. 1A and 1B as two controllably movable limbs 108 and 110. Suitable types of limb structures include, but are not limited to, vertebrate-style limbs, limbs with one or more linear degrees of freedom, pneumatic or hydraulic tentacles, wheel- or track-limb hybrids having a rotating structure supporting multiple jointed limbs, or another suitable limb structure. While the Figures herein depict limbed vehicles (e.g., the limbed vehicle 106) comprising two controllably movable limbs for simplicity, it is contemplated that the limbed vehicles described herein may comprise at least two limbs. For example, the limbed vehicle 106 or other limbed vehicle described herein may include three, four, five, six, seven, eight, or more, controllably movable limbs. In some embodiments, the controllably movable limbs may include legs and arms, such as more than two legs and one or more arms (not shown). Thus, as illustrated, the limbs 108 and 110 may be considered legs and, in certain embodiments, the limbs 108 and 110 may have a maximum stride length at least about equal to the post spacing S. Accordingly, in some embodiments, the post spacing S may be no greater than that of the maximum stride length. Suitable limbed vehicles for the limbed vehicle 106 include mobile biped vehicles as disclosed, for example, in U.S. Patent Application Publication 20050228539 ("the '539 application"), which is incorporated herein by reference. In one embodiment, the limb 108 includes a foot 112 and the limb 110 includes a foot 114 on which the limbed vehicle 106 may travel by moving the limbs 108 and 110 in a walking motion, and at least one foot 112 and 114 may be configured, for example, as disclosed in the '539 application.

The limbed vehicle 106 may be operated in a manner so that at least one limb 110 and 112 is directed to move from one post 102 onto another one of the posts 102 in a walking motion. For example, as shown in FIG. 1B, the limb 110 may be directed to move so that the foot 114 thereof is moved from limb-interfacing surface 103a of post 102a on which it is supported (See FIG. 1A) onto limb-interfacing surface 103b of post 102b, followed by directing the limb 108 to move so that the foot 112 thereof is moved from limb-interfacing surface 103c of post 102c on which it is supported (See FIG. 1A) onto limb-interfacing surface 103d of post 102d. Such motion may be continued until the limbed vehicle 106 has reached a desired destination over the medium 104.

In certain embodiments, the limb-interfacing surface 103 of a post 102 may have a large enough surface area relative to the size of the feet 112 and 114 of the limbed vehicle 106 so that both of the feet 112 and 114 may be positioned on a single one of the posts 102 to support the limbed vehicle 106 thereon. Thus, in such an embodiment, the limbed vehicle 106 may be directed to travel from one of the posts 102 that supports the entire weight of the limbed vehicle 106 to another one of the posts 102 that also supports the entire weight of the limbed vehicle 106 or the limbs 108 and 110 may be directed to independently move in a manner so that the limb 108 is supported by one of the posts 102 and the limb 110 is supported by a different one of the posts 102.

Figure 2:
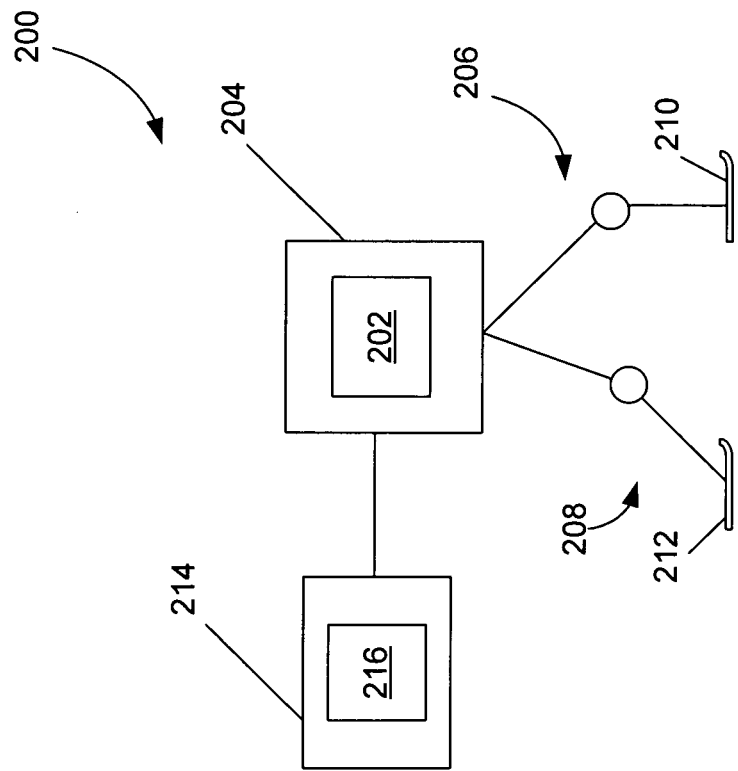
FIG. 2 is a diagrammatic view of a remotely controlled limbed vehicle that may be employed in the system shown in FIG. 1A according to one embodiment.

The limbed vehicle 106 may be remotely controlled, may be driven by an operator that rides in or on the limbed vehicle 106, or the limbed vehicle 106 may be pre-programmed to travel along a programmed route. For example, FIG. 2 is a diagrammatic view of a remotely controlled, limbed vehicle 200 according to another embodiment. The limbed vehicle 200 includes a controller 202 disposed within or on a vehicle body 204. The limbed vehicle 200 further includes controllably movable limbs 206 and 208, at least one of which includes corresponding feet 210 and 212.

Still referring to FIG. 2, a remote-control system 214 is operably coupled to the controller 202 of the limbed vehicle 200 via a wireless communication link (e.g., radio-frequency communication, optical communication, etc.) or a wired communication link (e.g., a flexible cable connection). The remote-control system 214 includes an operator interface 216, such as joystick, keyboard, touchscreen monitor, combinations of any of the foregoing, or other input device that, responsive to an operator's input, directs the operation of the vehicle 200 and, in particular, the movement of the limbs 206 and 208. In operation, the remote-control system 214 communicates instructions responsive to operator input via the operator interface 216 to the controller 202 of the limbed vehicle 200 that directs the operation of the limbed vehicle 200 (e.g., independent movement of the limbs 206 and 208).

Figure 3:
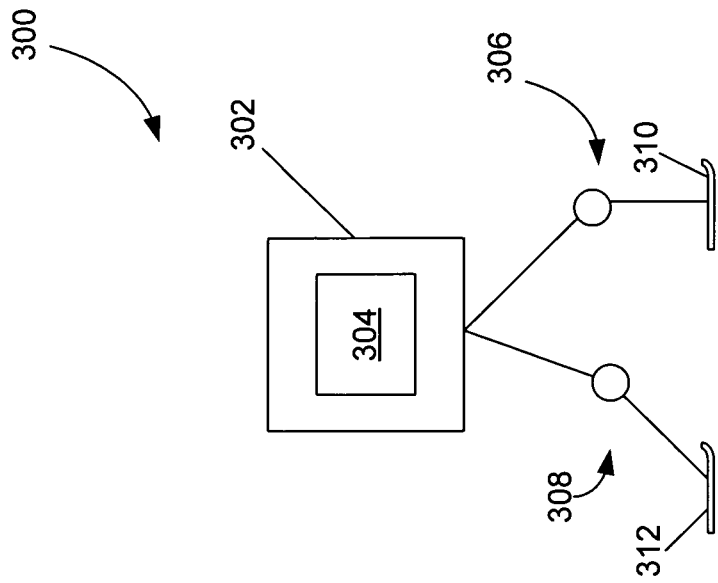
FIG. 3 is a diagrammatic view of a limbed vehicle in which an operator may ride therein and direct the operation thereof according to another embodiment.

Referring to FIG. 3, in other embodiments, a limbed vehicle may include provisions (not shown) for an operator to ride therein or thereon, and control the limbed vehicle. For example, according to one embodiment, a limbed vehicle 300 includes a vehicle body 302 that is configured to support an operator and an operator interface 304 that is operably coupled to the limbed vehicle's drive system (not shown). The operator interface 304 may include a joystick, touchscreen, wheel and pedal combination similar to a conventional automotive vehicle, keyboard, combinations of the foregoing, or other input device. The limbed vehicle 300 further includes controllably movable limbs 306 and 308, at least one of which includes corresponding feet 310 and 312. The operator may direct the limbs 306 and 308 to be selectively moved via the operator interface 304 to enable the limbed vehicle 300 to move at least one of the feet 310 and 312 from corresponding posts to other corresponding posts or to a common post, as desired, and previously described with respect to FIGS. 1A and 1B.

In a further embodiment, a limbed vehicle may include a robotic control system configured to automatically direct the movement of the controllably movable limbs and other operations of the limbed vehicle.

Figure 4:
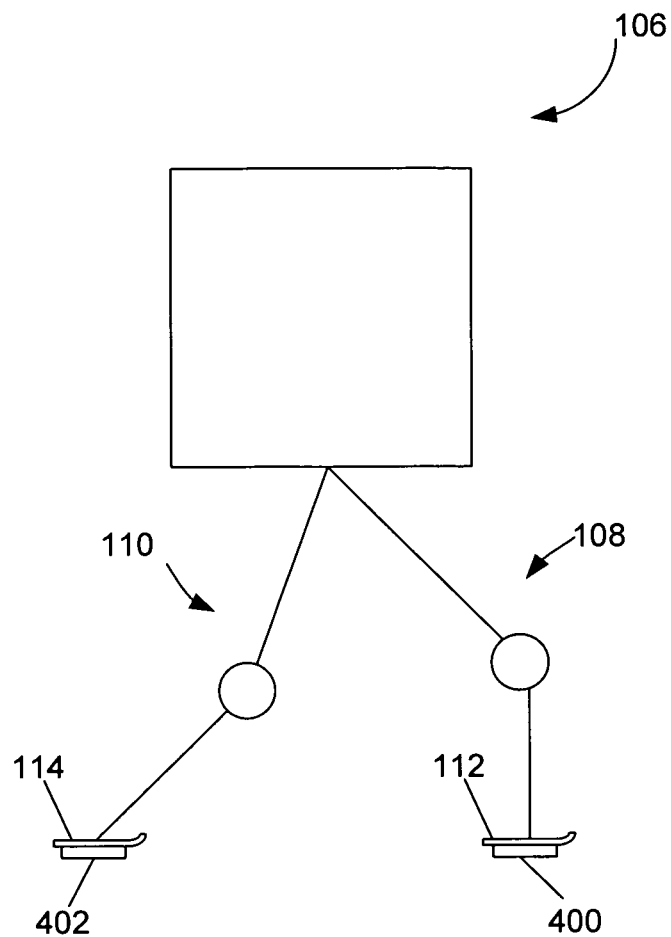
FIG. 4 is a schematic view of a limbed vehicle in which at least one foot thereof is configured to absorb or impart momentum to the limbed vehicle during movement according to another embodiment.

Referring to FIG. 4, in some embodiments, the limbed vehicle 106 may be configured to partially or completely absorb impact as at least one of the feet 112 and 114 contact a post 102. By way of non-limiting example, resilient members 400 and 402 may be attached to or form part of corresponding feet 112 and 114. The resilient members 400 and 402 may, for example, comprise a resilient, compressible polymeric material, such as rubber, that provides a selected compliance to at least one of the feet 112 and 114. In other embodiments, at least one resilient member 400 and 402 may comprise, for example, a contact member coupled to a corresponding foot 112 and 114 via a spring, a shock absorber, a compliant material, or another suitable compliant member or structure. In still another embodiment, at least one foot 112 and 114 may be configured with an integrated absorbing mechanism as disclosed, for example, in the aforementioned '539 application. In alternative embodiments, an absorbing structure may be configured within a movable limb, or configured between a limb and a foot or between a limb and the body of the vehicle.

The resilient members 400 and 402 may also be configured to impart momentum to the limbed vehicle 106. For example, as the foot 112 contacts a limb-interfacing surface 103 (See FIG. 1A) and the resilient member 400 is compressed, the resilient member 400 stores energy due to the compression and may impart at least a portion of the stored energy to the limbed vehicle 106 to conserve the momentum of the limbed vehicle 106. Imparting such energy to the limbed vehicle 106 may enable the limbed vehicle 106 to move from one post 102 to another post 102 that are spaced from each other a distance greater than a stride length of the limbs 108 and 110 of the limbed vehicle 106. That is, the limbed vehicle 106 may "jump" from one of the posts 102 to another one of the posts 102. Alternatively, imparting such energy to the limbed vehicle 106 may enable the limbed vehicle 106 to conserve energy as it moves from one post 102 to another post 102.

Figure 5B:
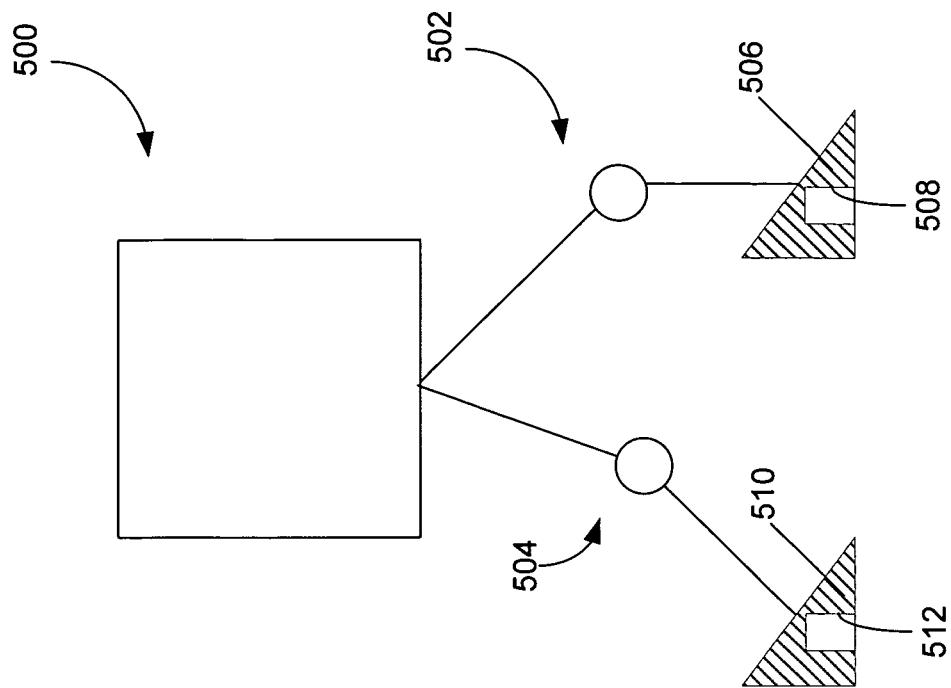
FIG. 5B is the limbed vehicle shown in FIG. 5A in which the feet are shown in cross-section to illustrate the configuration of the post-interfacing mechanisms in more detail.
Figure 5A:
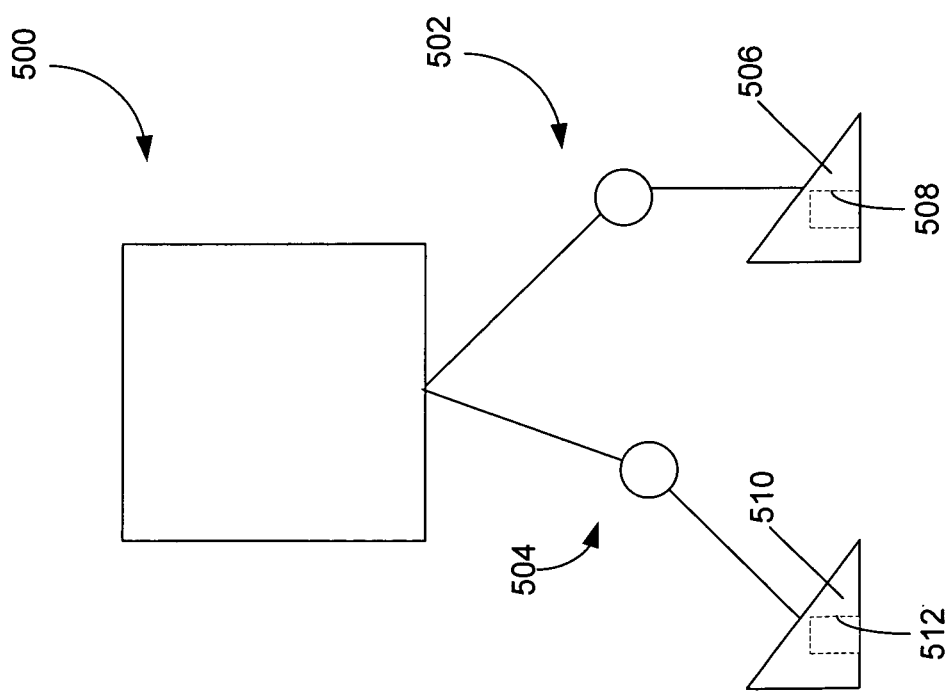
FIG. 5A is a schematic view of a limbed vehicle in which at least one foot thereof includes a post-interfacing mechanism, depicted in phantom, configured to at least partially interlock with a post during operation according to yet another embodiment.

Referring to FIGS. 5A and 5B, in some embodiments, at least one foot of a limbed vehicle employed in any of the described systems may be configured to at least partially physically interface (e.g., at least partial interlocking) with the posts 102. Such at least partial physical interfacing may promote stability of the limbed vehicle during travel on the posts 102. In one embodiment, a limbed vehicle 500 includes controllably movable limbs 502 and 504 (e.g., depicted in the FIGS. 5A and 5B as legs). The limb 502 includes a foot 506 having a female post-interfacing mechanism 508 (shown in phantom in FIG. 5A) and the limb 504 also includes a foot 510 having a similarly configured female post-interfacing mechanism 512 (shown in phantom in FIG. 5A). In one embodiment, at least one of the female post-interfacing mechanisms 508 and 512 is configured as recesses formed in the corresponding feet 506 and 510 and configured to receive one of the posts 102 therein (See FIG. 1A). In some embodiments, one or both recesses may exhibit a diameter or lateral dimension selected so that there is a slight interference fit with one of the posts 102 (See FIG. 1A) when the recess receives the post 102. In another embodiment, at least one of or each foot 506 may include a gripping mechanism (not shown), such as multi-digit member (e.g., a multi-toe foot) configured to grip one of the posts 102.

Figure 5C:
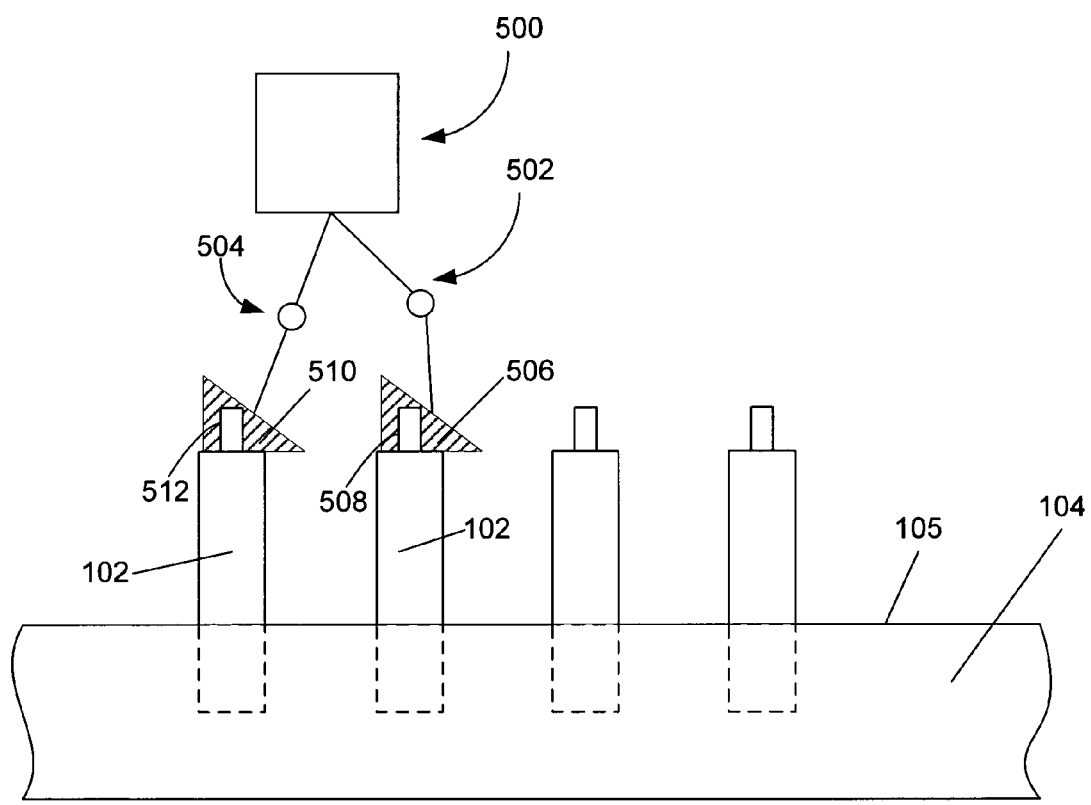
FIG. 5C is a schematic side elevation view of another embodiment of a system including a plurality of spaced posts, one or more of which has a male limb-interfacing mechanism extending therefrom, and a limbed vehicle having female post-interfacing mechanisms configured to at least partially physically interface with the male limb-interfacing mechanisms.

Referring to FIG. 5C, in other embodiments of a system, one or more of the posts 102 may include a male limb-interfacing mechanism 520, such as a projection, extending therefrom and that is configured to at least partially interface with the female post-interfacing mechanisms 508 and 512 of the limbed vehicle 500 (FIGS. 5A and 5B). As described above in conjunction with FIGS. 5A and 5B, the female limb-interfacing mechanisms 508 and 512 may also be configured so that there is a slight interference fit when one of the projections (See FIG. 1A) is inserted therein.

Figure 6:
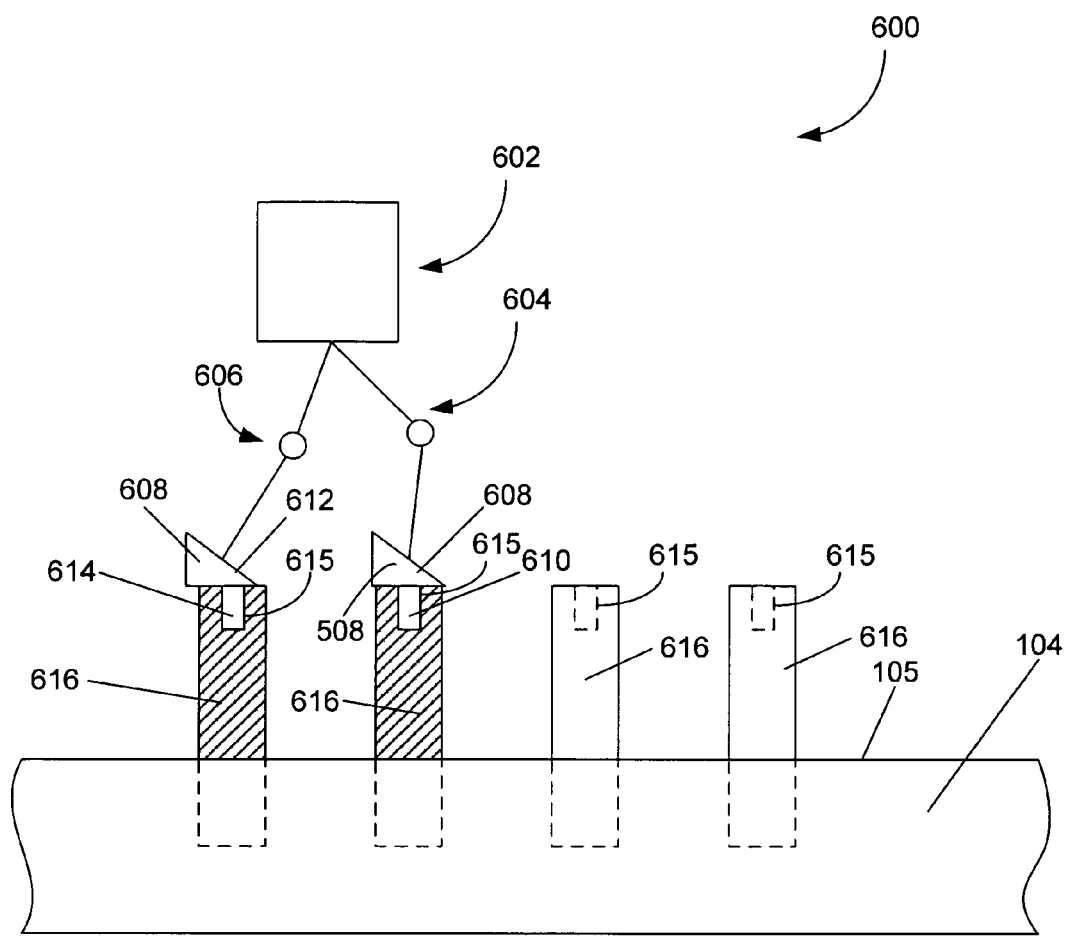
FIG. 6 is a schematic side elevation view of another embodiment of a system including a plurality of spaced posts shown in cross-section, one or more of which has a female limb-interfacing mechanism, and a limbed vehicle having male post-interfacing mechanisms configured to at least partially physically interface with the female limb-interfacing mechanisms.

FIG. 6 is a schematic view according to another embodiment of a system 600. The system 600 includes a limbed vehicle 602 having controllably movable limbs 604 and 606 (e.g., legs). The limb 604 includes a foot 608 having a male post-interfacing mechanism 610 and the limb 606 also includes a foot 612 having a similarly configured male post-interfacing mechanism 614. The male post-interfacing mechanisms 610 and 614 may be projections extending from corresponding feet 608 and 612 and configured to be inserted into a female limb-interfacing mechanism 615 formed in at least one post 616 of a distribution of posts. In one embodiment, the male post-interfacing mechanisms 610 and 614 may be removably attached to corresponding feet 608 and 612 so that they may be exchanged with male post-interfacing mechanisms of different sizes or geometries, as desired. As illustrated, the female limb-interfacing mechanism 615 may be a recess and, in some embodiments, may exhibit a diameter or lateral dimension selected so that there is a slight interference fit with a male post-interfacing mechanism 610 when the received by the female limb-interfacing mechanism 615.

Figure 7:
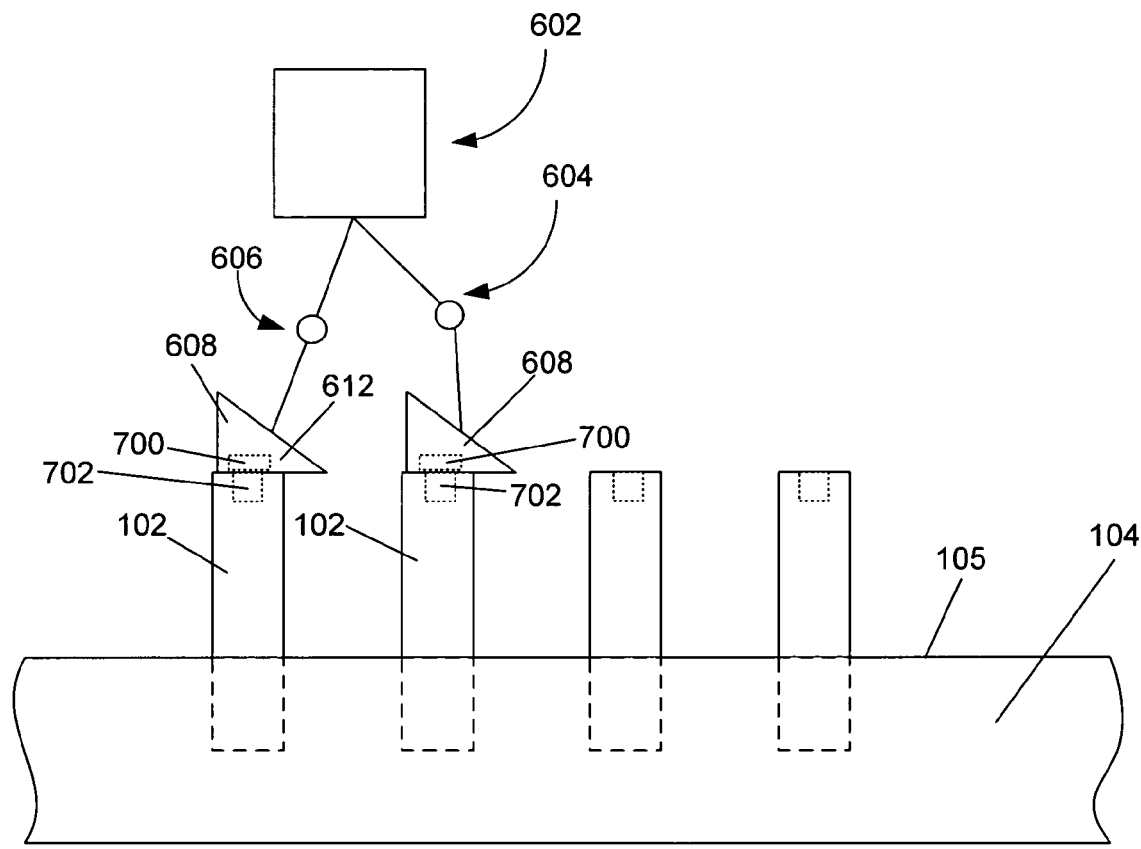
FIG. 7 is a schematic side elevation view of another embodiment of a system including a plurality of spaced posts, one or more of which has an electromagnet mechanism or a magnetic mechanism (shown in phantom), and a limbed vehicle having limbs including an electromagnetic mechanism or a magnetic mechanism (also shown in phantom) configured to be coupled with the electromagnet or magnetic mechanism of the posts via magnetic attraction.

Referring to FIG. 7, in other embodiments, at least one limb of a limbed vehicle and at least one post of a plurality of spaced posts may include an electromagnet mechanism or a magnetic mechanism configured to controllably couple and physically interface the at least one limb with the at least one post. In FIG. 7, at least one foot 608 of the limbed vehicle 602 may include or have attached thereto a mechanism 700 (i.e., a post-interfacing mechanism), such as an electromagnet or a permanent magnet. At least one post 102 may also include or have attached thereto a mechanism 702 (i.e., a limb-interfacing mechanism), such as an electromagnet or a permanent magnet.

During travel on the posts 102, at least one foot 608 of the limbed vehicle 600 may be magnetically attracted to a corresponding post 102 or to a common post 102 via magnetic attraction between the mechanisms 700 and 702. The strength of the magnetic attraction may be controlled by controlling the magnetic field strength of the mechanisms 700 and 702. For example, the type of permanent magnet that is employed may be selected based on its strength or the strength of the magnetic field of the electromagnet may be controllably adjusted. However, despite the magnetic attraction between the mechanisms 700 and 702, the limbed vehicle 602 has sufficient power to disengage at least one foot 608 from a corresponding post 102.

Figure 8:
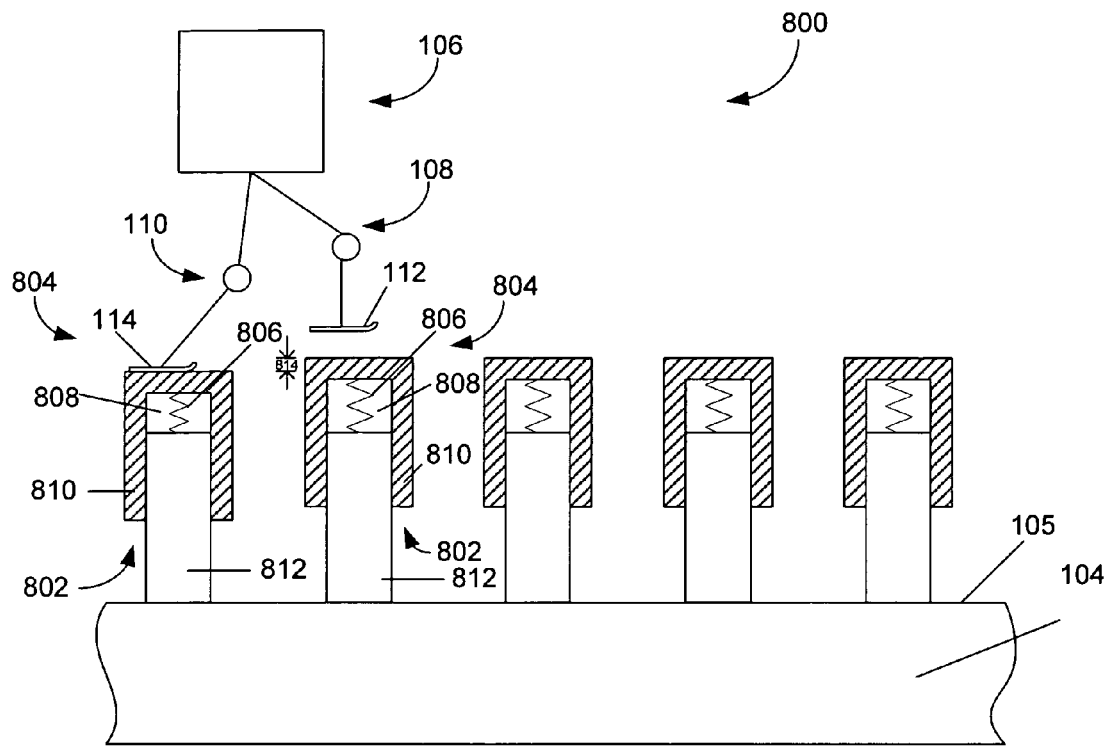
FIG. 8 is a schematic view of a system, according to another embodiment, which includes a limbed vehicle and a plurality of spaced posts, one or more of which includes an absorbing mechanism.

Referring to FIG. 8, in some embodiments, at least one, some, or all of the posts on which any of the described limbed vehicles may travel may include an absorbing mechanism configured to partially or completely absorb touch-down loads of a limbed vehicle in a vertical direction to controllably modify momentum of the limbed vehicle. FIG. 8 is a schematic view of a system 800, according to another embodiment, which includes the limbed vehicle 106 of FIG. 1A and a plurality of spaced posts 802, at least one of which includes an absorbing mechanism 804. Absorbing mechanism 804 may include a resilient member 806 (e.g., a spring or deformable, compliant material) disposed within an interior space 808 defined by an enclosure 810. The enclosure 810 receives a support member 812 (e.g., a post) and is illustrated in cross-section to reveal the resilient member 806 disposed therein.

In operation, the enclosure 810 of absorbing mechanism 804 may be axially displaced along a length of the support member 812 to help absorb a component of the momentum of the limbed vehicle 106 in a vertical direction (i.e., axially) as the limbed vehicle 106 steps on post 802. For example, as shown in FIG. 8, the foot 114 of the limb 110 of the limbed vehicle 106 is depicted stepping on one of the posts 802 to compress the absorbing mechanism 804 thereof a distance 814. Thus, during operation, the limbed vehicle 106 may be directed to contact the post 802 and cause the absorbing mechanism 804 to absorb at least a portion of the vertical component of the touch-down momentum.

The resilient member 806 of the absorbing mechanism 804 may also impart force to the limbed vehicle 106 to enable the limbed vehicle 106 to move from a first one of the posts 802 to second one of the posts 802 that is spaced from the first one of the posts 802 a distance greater than a stride length of the limbs 108 and 110 of the limbed vehicle 106. For example, as the foot 114 contacts the upper surface of the enclosure 810 and compresses the resilient member 806, the resilient member 806 stores energy due to the compression and at least a portion of the stored energy may be released and imparted to the limbed vehicle 106 to increase the momentum of the limbed vehicle 106. In another embodiment, the resilient member 804 may be configured as a hydraulic or pneumatic ram that absorbs force from and imparts force to the limbed vehicle 106 responsive to the limbs 108 or 110 contacting the post 802 and triggering, for example, a switch. In such an embodiment, the ram may be function as a passive shock absorber when one or more of the limbs 108 and 110 of the limbed vehicle 106 contact the post 802 and the ram may be actuated to impart a force to the limbed vehicle 106 when the ram is axially displaced downward a selected distance.

Figure 9:
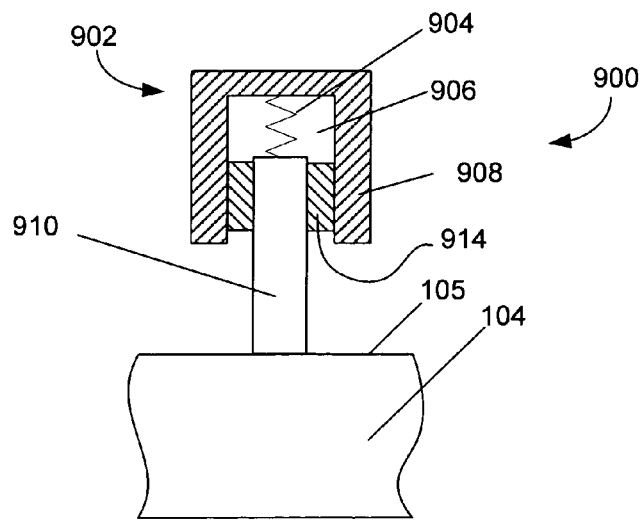
FIG. 9 is a schematic partial cross-sectional view of a post that includes an absorbing mechanism configured to absorb both vertical and horizontal touch-down loads when contacted by a limb of any of the described limbed vehicles according to another embodiment.

Referring to FIG. 9, in other embodiments, one or more posts of a system may be configured to partially or completely absorb lateral touch-down loads in addition to being configured to absorb the vertical touch-down loads associated with a limbed vehicle stepping onto a post. FIG. 9 is a schematic partial cross-sectional view of a post 900 that includes an absorbing mechanism 902 configured to absorb both vertical and horizontal touch-down loads according to another embodiment. The absorbing mechanism 902 may include a resilient member 904 (e.g., a spring or deformable, compliant material) disposed within an interior space 906 defined by an enclosure 908 and between a support member 910 and the enclosure 908. The enclosure 908 is illustrated in cross-section to reveal the internal components of the absorbing mechanism 902. The resilient member 904 is oriented to be compressed along an axial direction of the post 900. A resilient member 912 (e.g., a sleeve of compliant material) may extend about a portion of the support member 910 and may be compressible in a horizontal direction generally perpendicular to the axial direction of the post 900. Thus, during operation, a limbed vehicle may be directed to contact the post 902 and cause the absorbing mechanism 904 to absorb at least a portion of a vertical and a horizontal component of the touch-down momentum of a limbed vehicle.

The post 802 shown in FIG. 8 and the post 902 shown in FIG. 9 represent two different embodiments for absorbing or imparting momentum to a limbed vehicle. Variations of these embodiments may be employed that are capable of absorbing or imparting momentum to a limbed vehicle.

In other embodiments, one or more posts of a post network may change configuration responsive to interacting with a limbed vehicle, or one or more limbs of the limbed vehicle may change configuration responsive to interacting with at least one post. The change in the configuration of the post or limb may occur before, during, or after the limb-post interaction. For example, one or more of the posts may include respective deployable platforms. Responsive to at least one limb of the limb vehicle contacting a first post, at least a second post in operable communication with the first post may deploy a platform to provide a larger limb-interfacing surface for the approaching limbed vehicle. In other embodiments, one or more of the platforms may automatically deploy at a specified time, such as before or during the time that the limbed vehicle travels on the posts. In another embodiment, as at least one limb of the limbed vehicle contacts the post, the configuration may change (e.g., deploying a platform, actuating a force-imparting device to impart force to the at least one limb, etc.).

In other embodiments, at least one limb of the limbed vehicle may change configuration responsive to interacting with at least one post. For example, a first set of posts may be distributed on land and a second set of posts may be distributed in a body of water (e.g., a lake or ocean). At least one limb of the limbed vehicle may deploy an inflatable structure before or during travel on the second set posts as a safety precaution should the limbed vehicle fall into the body of water. In another embodiment, one or more of the limbs of the limbed vehicle may change from a high-drag configuration (e.g., having high surface area) to a low-drag configuration responsive to interacting with at least one post. Other changes in limb configurations are also contemplated herein.

The various disclosed embodiments of systems may be employed in a variety of different application environments. Turning again to FIG. 1A, for example, the medium 104 may be an environmentally-sensitive region (e.g., wetland, riverbed, lakebed, marsh, grass land, forest, a region or area provided environmental protection by a governmental entity, etc.) and, thus, the surface 105 may be an environmentally-sensitive area. In such an embodiment, the posts 102 may enable the limbed vehicle 106 to travel over the environmentally-sensitive area without causing substantially any damage so that, for example, equipment or supplies may be transported. In another embodiment, the medium 104 may be an ocean, sea, lake, or other liquid body and the posts 102 extend above, or limb-interfacing surfaces 103 thereof are located below or substantially at a surface of the liquid body to enable the limbed vehicle 106 to travel over the liquid body. In yet another embodiment, the medium 104 may be a substantially impassable with a conventional wheeled or tracked vehicle (e.g., an automobile or a tractor). For example, the medium 104 may be a marsh area, a swamp, closely-spaced trees, or other medium that is substantially impassable by a conventional wheeled or tracked vehicle. In such an embodiment, the system 100 or any other system described herein may enable transport of goods, people, etc. over the medium 104 in an efficient manner. In other embodiments, the medium 104 may be an agricultural field.

Figure 10A:
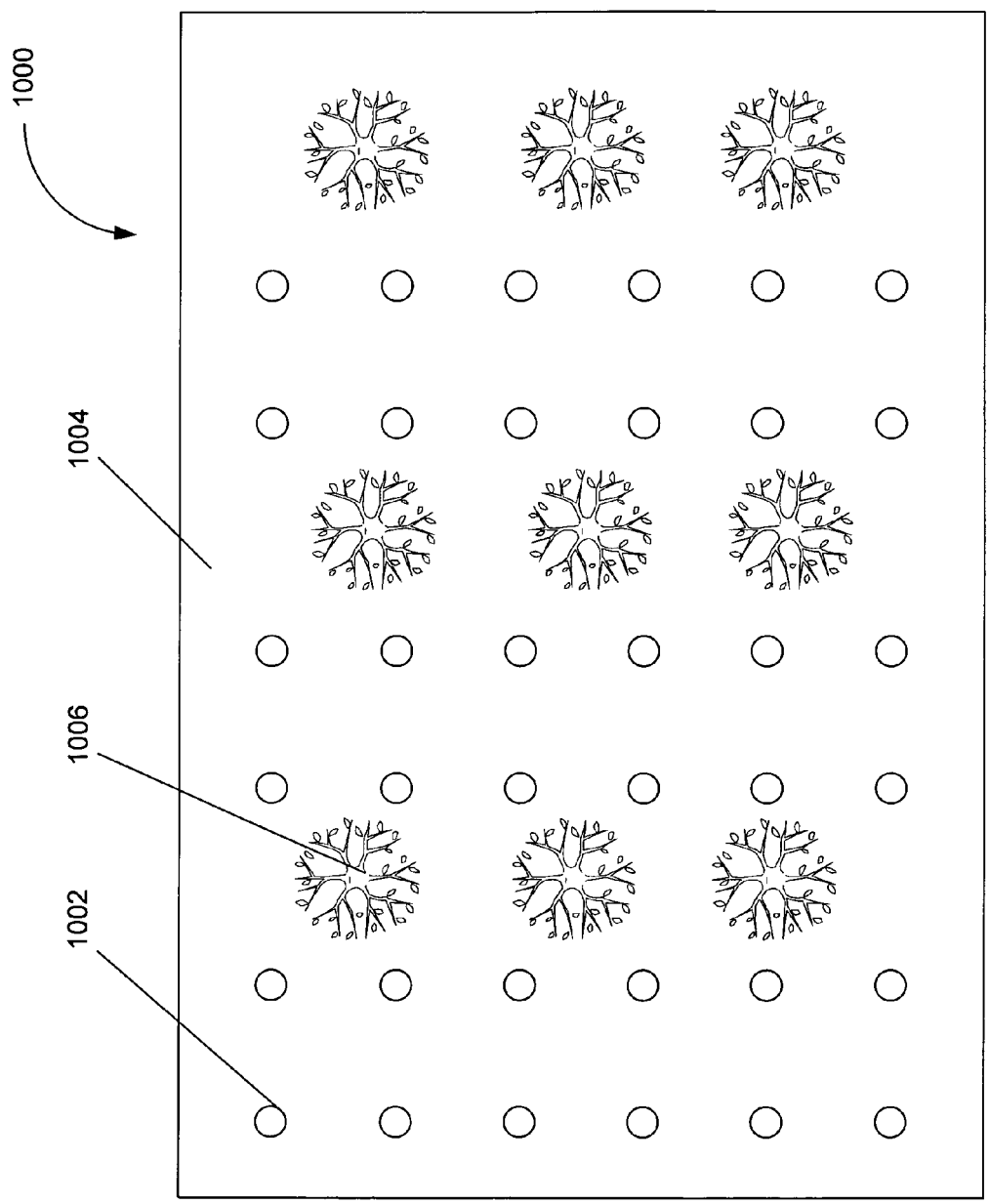
FIG. 10A is a schematic plan view of one embodiment of a system including a plurality of spaced posts that are distributed in an agriculture field so that a limbed vehicle may travel through or over the agriculture field using the posts.
Figure 10B:
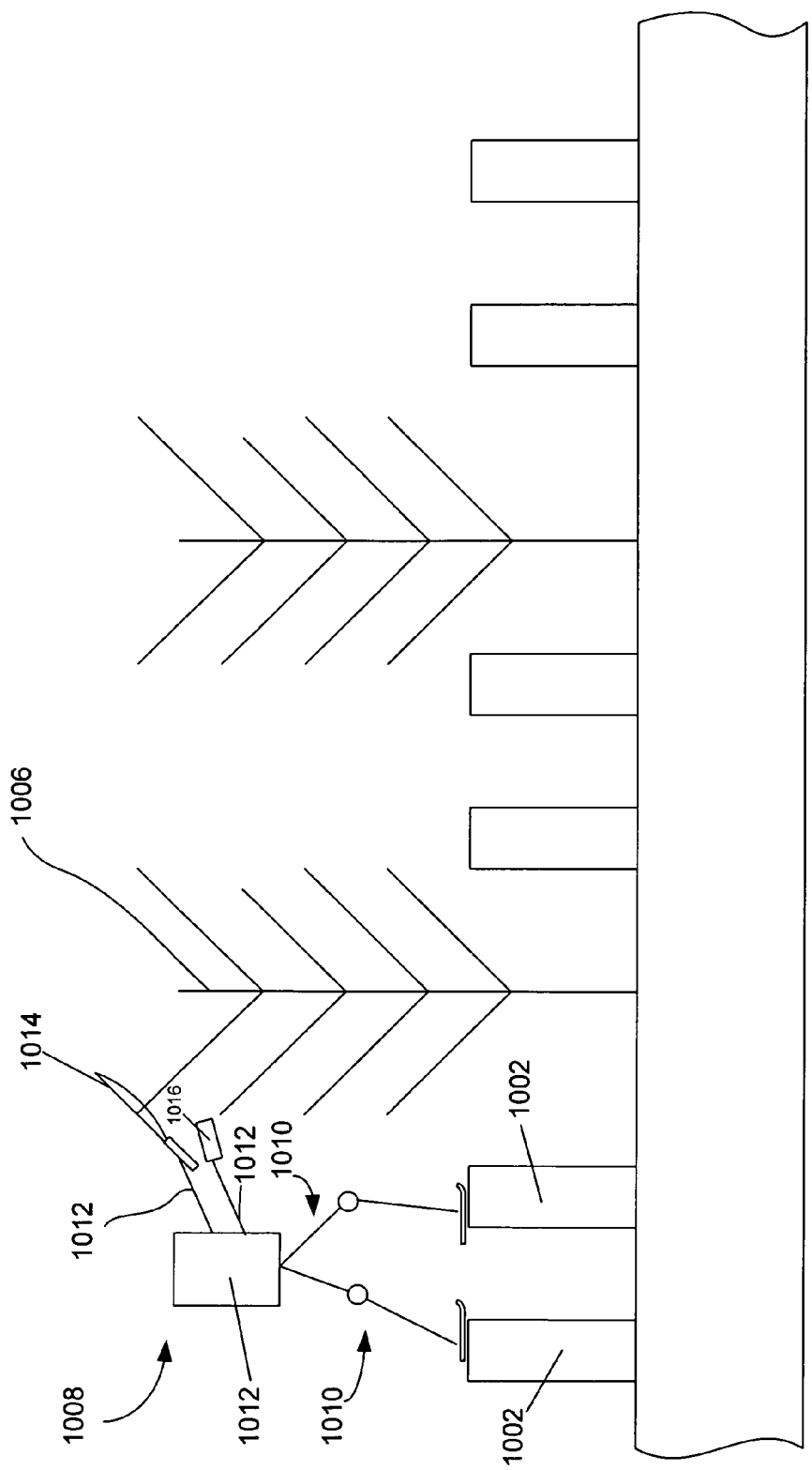
FIG. 10B is a schematic side elevation view of the system shown in FIG. 10A depicting the limbed vehicle supported on two of the posts and servicing one of the crops of the agriculture field.

FIGS. 10A and 10B depict an embodiment of a system 1000 employed in an agriculture environment. The system 1000 includes a plurality of spaced posts 1002 that may be arranged in rows and columns. For example, two rows of posts 1002 may be positioned in an agriculture field 1004 on either side of a row of crops 1006. As shown in the schematic side elevation view of the system 1000 in FIG. 10B, the posts 1002 are disposed within the agriculture field 1004 using any of the previously described installation techniques and extends a sufficient distance above the agriculture field 1004 so that a limbed vehicle 1008 of the system 1000 that travels thereon may access the crops 1006.

Still referring to FIG. 10B, the limbed vehicle 1008 may include a plurality of controllably movable legs 1010 projecting from a vehicle body 1012. One of the legs 1010 is shown supported by one of the posts 1002 and the other leg 1010 is shown supported by another one of the posts 1002. However, in some embodiments, the limbed vehicle 1008 may include more than two legs (e.g., four legs), and at least one of the legs may be supported by a corresponding post 1002 to provide increased stability. The limbed vehicle 1008 may also include a plurality of arms 1012. For example, one or more of the arms 1012 may include a gripping mechanism, such as multi-fingered hand. One of the arms 1012 may also hold an agriculture tool 1014 (e.g., shears, a dispenser, or other suitable tool) and the other arm 1012 may carry an end effector 1016 that may be configured to operate in conjunction with the agriculture tool 1014. For example, the end effector 1016 may comprise a vacuum tool, a multi-fingered hand, or another suitable end effector configured to pick-up crops cut by the agriculture tool 1014. As another example, the agriculture tool 1014 may be omitted and at least one arm 1012 may include a multi-fingered hand configured to pick or otherwise service the crops 1006. In a further example, the agriculture tool 1014 may be a dispenser configured to apply reagents to the agriculture field 1004 or the crops 1006, such as fertilizer, pesticide, herbicide, or another suitable reagent. In another example, the agriculture tool 1014 may also configured and used for dispensing seeds on the agriculture field 1004.

In some embodiments, the limbed vehicle 1008 may be tall enough so that at least the vehicle body 1012 may be positioned above the crops 1006 while supported on the posts 1002. In other embodiments, some or all of the posts 1002 may be configured to be adjustable in height (e.g., telescoping in length) so that the position of the limbed vehicle 1008 relative to the crops 1006 may be selectively adjusted.

In operation, the limbed vehicle 1008 of the system 1000 may be directed to travel on the posts 1002, as previously described with respect to any of the other embodiments, and service selected crops 1006 while supported on one or more posts 1002.

Figure 11:
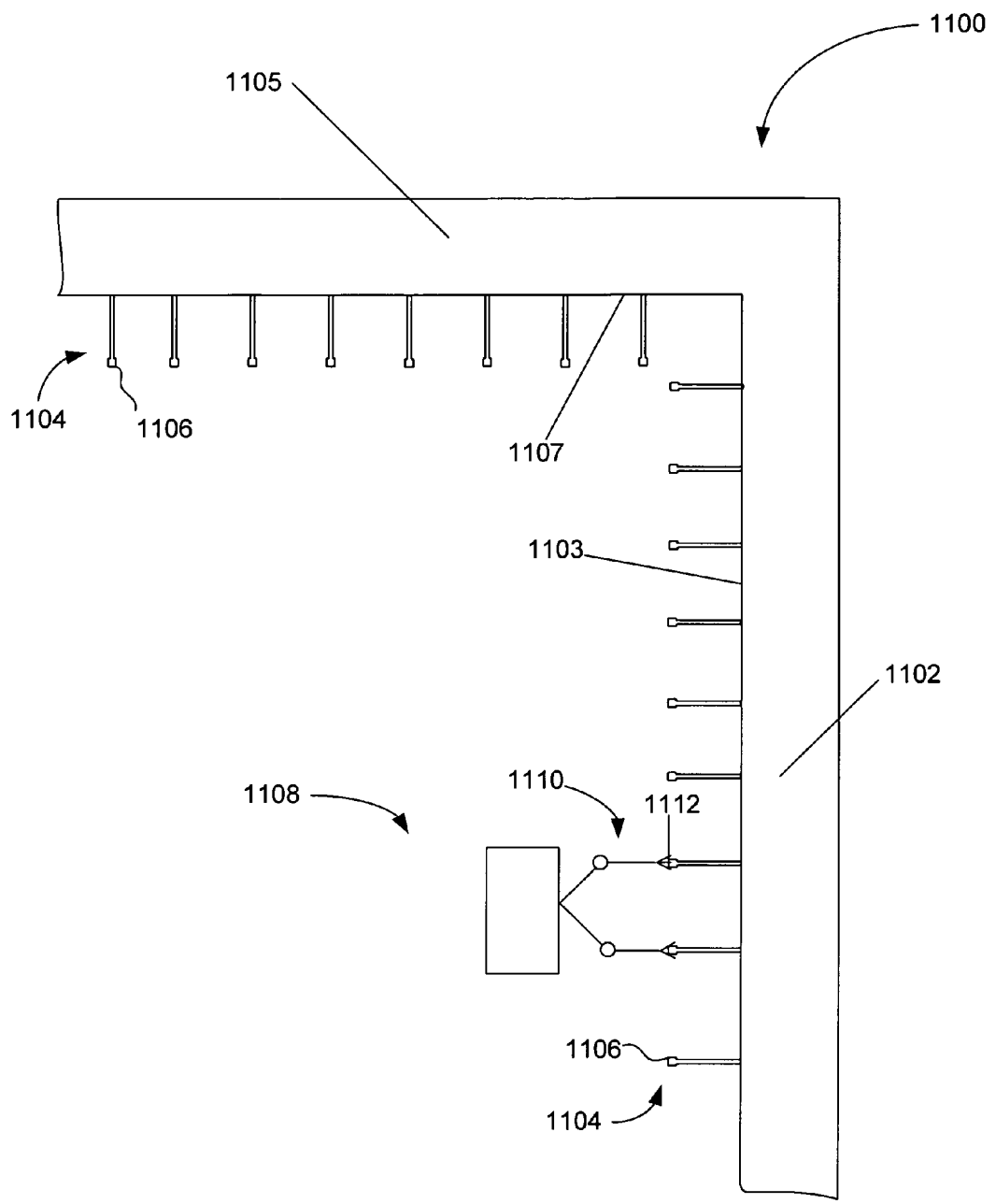
FIG. 11 is a schematic side elevation view of a system including a limbed vehicle and a plurality of spaced posts distributed vertically and horizontally according to another embodiment.

FIG. 11 is a schematic side elevation view of a system 1100 according to yet another embodiment and illustrates the manner in which a limbed vehicle and posts may be used to travel vertically and on overhanging structures. The system 1100 includes a vertical structure 1102 (e.g., a wall) having a plurality of spaced posts 1104 projecting outwardly from a substantially vertical surface 1103 thereof and a horizontal structure 1105 (e.g., a ceiling) having a plurality of the spaced posts 1104 projecting downwardly from a substantially horizontal surface 1107 thereof. At least one post 1104 may include a flange portion 1106 to facilitate gripping by a limbed vehicle 1108 of the system 1100. However, in other embodiments, the flange portion 1106 may be omitted. The limbed vehicle 1108 may include a plurality of limbs 1110, at least one of which includes a gripping mechanism 1112 configured to grip a flange portion 1106 of one of the posts 1104. For example, at least one gripping mechanism 1112 may comprise a multi-fingered hand that is configured to grip a flange portion 1106 with sufficient strength to enable the limbed vehicle 1108 to travel vertically on the posts 1104 projecting from the vertical structure 1102 and horizontally on the downwardly projecting posts 1104 projecting from the horizontal structure 1105.

In operation, the limbed vehicle 1108 may be directed to vertically ascend on the posts 1104 extending from the vertical structure 1102 by moving the limbs 1110 in a walking motion and gripping at least one post 1104 that the individual limbs 1110 contact. The limbed vehicle 1108 may also be directed to travel horizontally on the posts 1104 extending downwardly from the horizontal structure 1105 in a similar manner. As previously described in FIG. 7, in some embodiments, the posts 1104 and limbs 1110 of the limbed vehicle 1108 may be magnetically coupled.

Figure 12A:
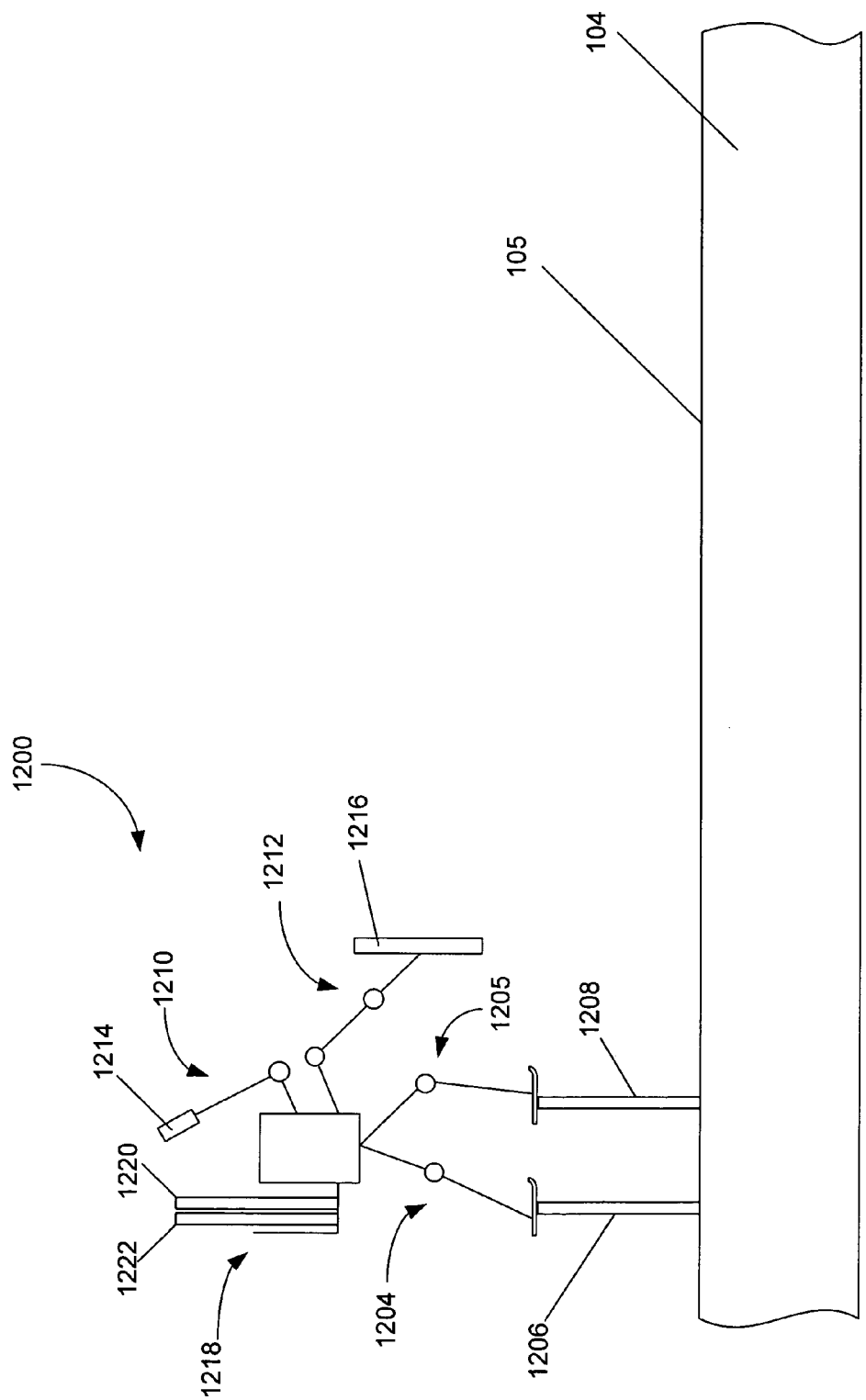
FIGS. 12A-12C are schematic side elevation views that illustrate a method of installing posts in a medium according to another embodiment.
Figure 12B:
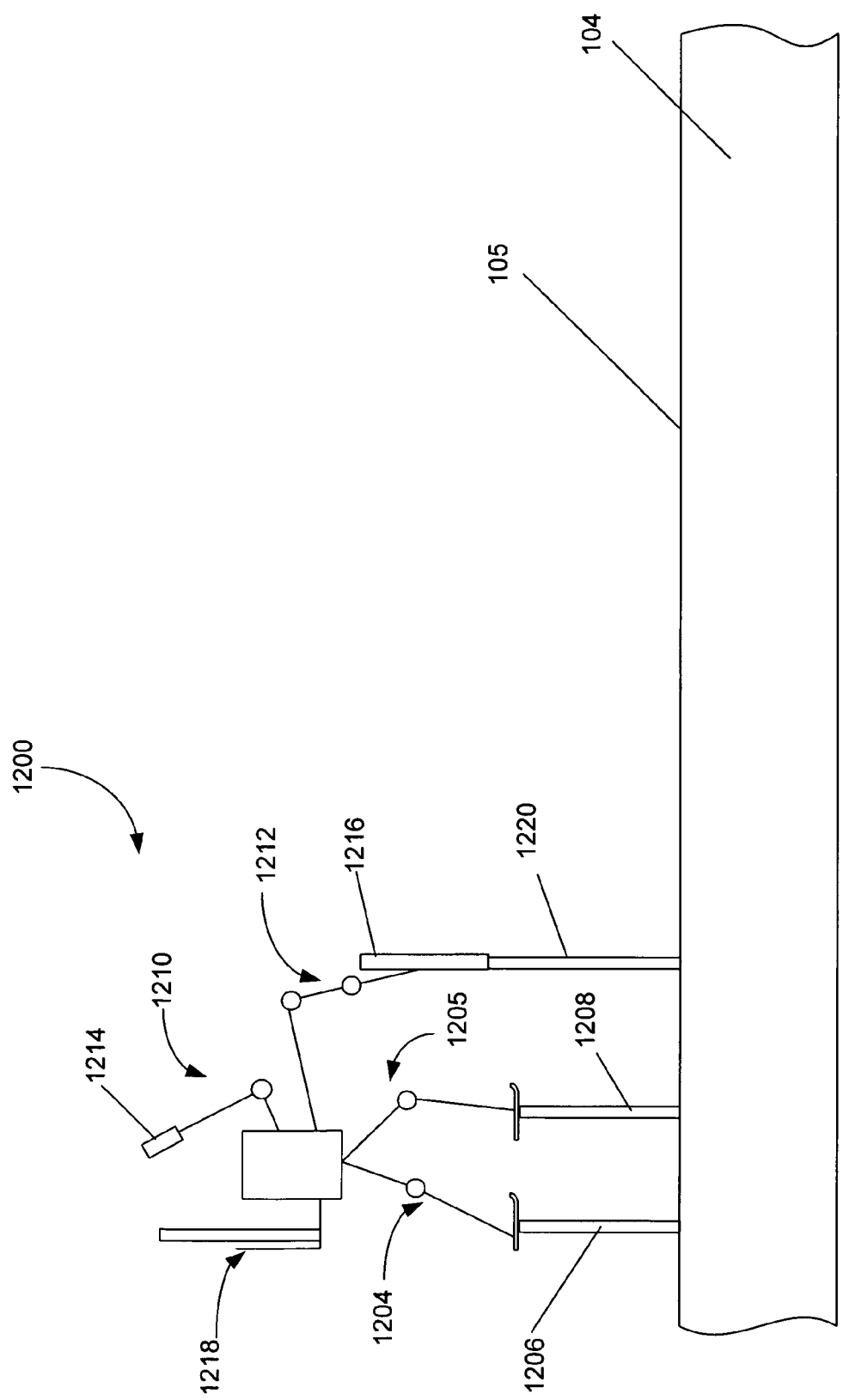
Figure 12C:
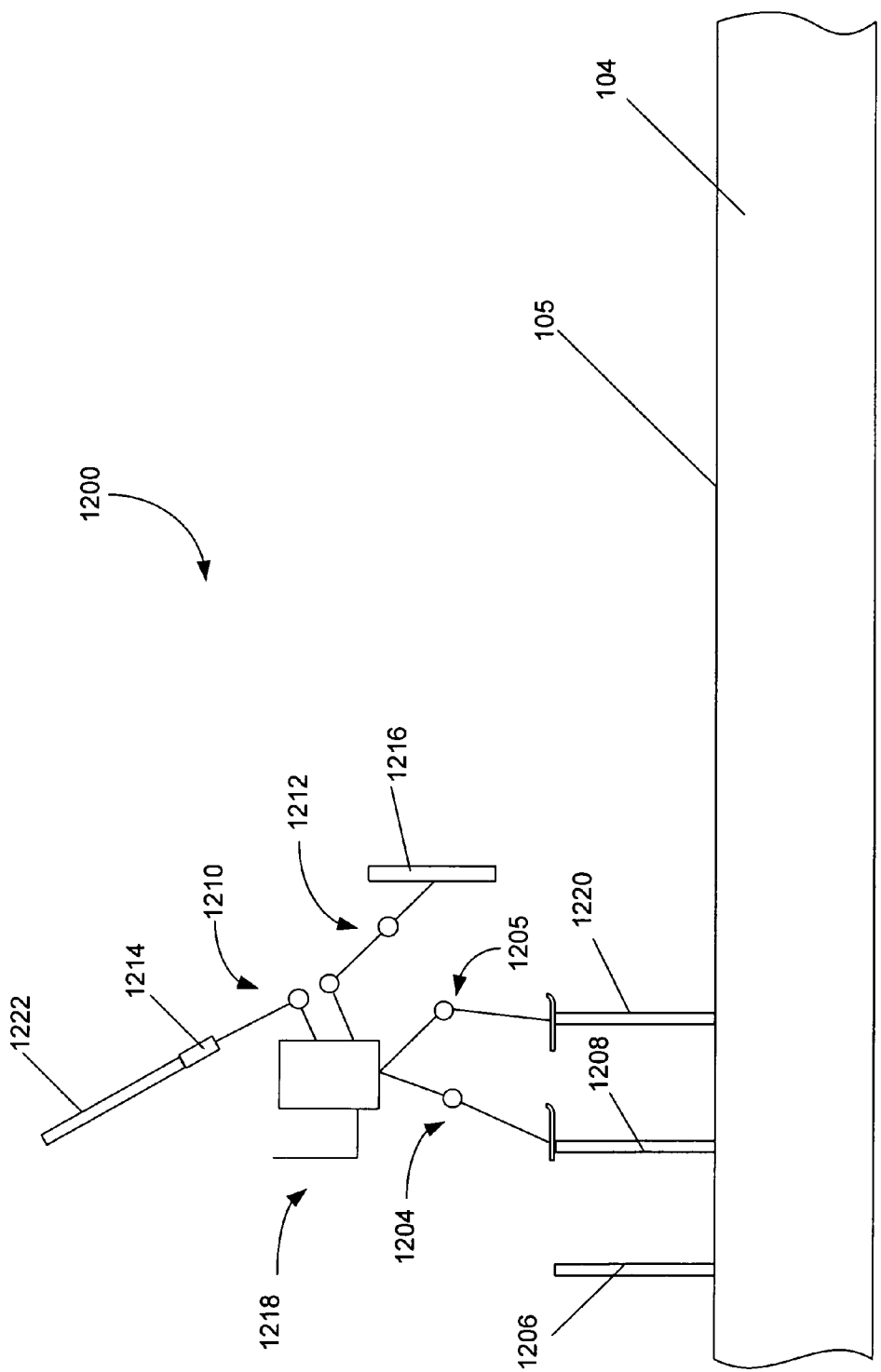

The limbed vehicles described herein may also be used to deploy posts on which the limbed vehicle may travel. Accordingly, FIGS. 12A-12C are schematic side elevation views that illustrate a method of installing posts according to another embodiment. As shown in FIG. 12A, a limbed vehicle 1200 may include a vehicle body 1202 having a plurality of controllably movable legs 1204 and 1205 projecting therefrom that are configured to enable the limbed vehicle 1200 to walk on posts, as previously described. The limbed vehicle 1200 is shown supported on posts 1206 and 1208, which may have been installed by the limbed vehicle 1200 or by any other suitable technique. The limbed vehicle 1200 may further include arms 1210 and 1212. For example, the arm 1210 may include or carry an end effector 1214 (e.g., a multi-fingered hand) and the arm 1210 is movable so that the end effector 1214 may pick-up and carry posts (only posts 1220 and 1222 shown for simplicity) held in a post supply 1218 carried by the limbed vehicle 1200. The arm 1212 may include or carry a post-installation apparatus 1216 configured to drive a post into the medium 104, such as a pneumatic or hydraulic post driver.

Figure 12D:
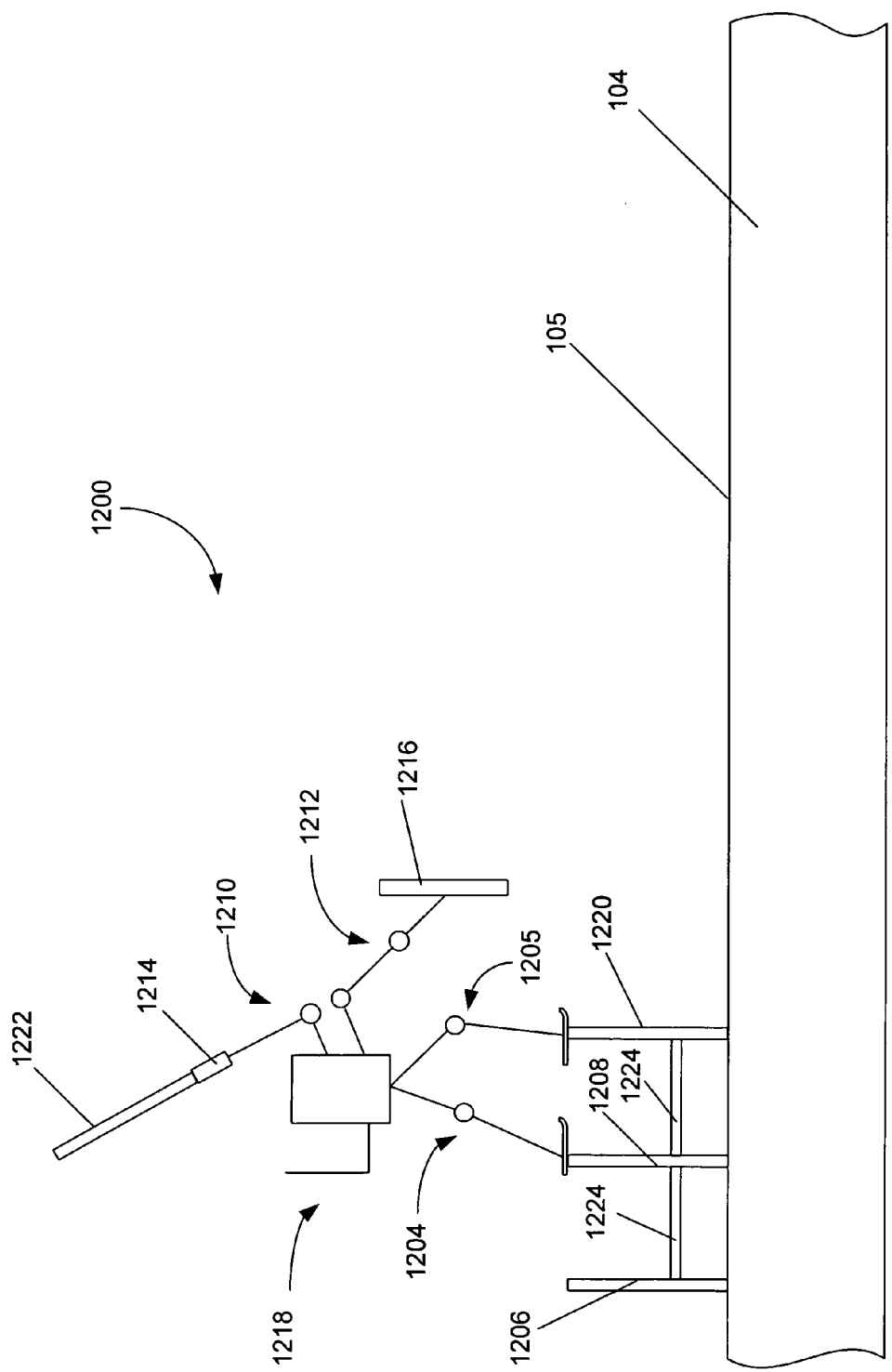
FIG. 12D is schematic side elevation view that illustrates how adjacent posts may be mechanically interconnected to provide increased structural support according to one embodiment.

As shown in FIG. 12B, the arm 1210 may be directed to position, for example, the post 1220 on the surface 105 of the medium 104 in a desired location and the arm 1212 may position the post-installation apparatus 1216 in a driving position. The post-installation apparatus 1216 may be directed to drive the post 1220 into the medium 104 to emplace the post 1220 therein. As shown in FIG. 12C, after emplacing the post 1220, the limbed vehicle 1200 may be directed to move one of the limbs 1204 and 1205 onto the post 1220. For example, the leg 1205 may be directed to move from the post 1208 to the newly emplaced post 1220, and the leg 1204 may be directed to move from the post 1206 to the post 1208. Other traveling techniques may be employed. For example, the leg 1204 may be directed to move from the post 1206 to another post (not shown) positioned in the same row as the post 1208 prior to the leg 1205 being directed from the post 1208 to the post 1220, or the leg 1204 may be directed to move from the post 1206 to share the post 1208 with the leg 1205 prior to the leg 1205 being directed from the post 1208 to the post 1220. The process of directing the limbed vehicle 1200 to emplace a post followed by directing the limbed vehicle 1200 to move one or more of the limbs 1204 and 1205 onto the emplaced post may be continued until a sufficient number of posts are emplaced. Thus, in the embodiment described with respect to FIGS. 12A-12C, the limbed vehicle 1200 may not only emplace posts in a selected arrangement, but may also perform any of the previously described functions (e.g., service crops or transport goods). Additionally, as shown in FIG. 12D, if desired, the limbed vehicle 1200 may be directed to mechanically interconnect adjacent posts, (e.g., the posts 1206, 1208, and 1220) with structural members 1224 via, for example, various types of couplings to provide additional structural support.

Although the method described with respect to FIGS. 12A-12D describes directly installing the posts into the medium 104 (e.g., the ground), in other embodiments, one or more of the posts (e.g., at least one of the posts 1206, 1208, and 1220) or the structural members 1224 may be mechanically coupled to a support structure at least partially embedded in the medium 104.

In other embodiments, the post-installation apparatus 1216 may be configured as a machine configured to drill a borehole in the medium 104. In such an embodiment, the apparatus 1216 of the limbed vehicle 1200 may be directed to drill a borehole in the medium 104 followed by directing the end effector 1214 to pick-up the post 1220 and position the post 1220 in the drilled borehole.

The herein described components (e.g., steps), devices, and objects and the description accompanying them are used as examples for the sake of conceptual clarity and that various configuration modifications using the disclosure provided herein are within the skill of those in the art. Consequently, as used herein, the specific exemplars set forth and the accompanying description are intended to be representative of their more general classes. In general, use of any specific exemplar herein is also intended to be representative of its class, and the non-inclusion of such specific components (e.g., steps), devices, and objects herein should not be taken as indicating that limitation is desired.

With respect to the use of substantially any plural or singular terms herein, those having skill in the art can translate from the plural to the singular or from the singular to the plural as is appropriate to the context or application. The various singular/plural permutations are not expressly set forth herein for sake of clarity.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable", to each other to achieve the desired functionality. Specific examples of operably couplable include but are not limited to physically mateable or physically interacting components or wirelessly interactable or wirelessly interacting components or logically interacting or logically interactable components.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. Furthermore, it is to be understood that the invention is defined by the appended claims. It will be understood that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an"; the same holds true for the use of definite articles used to introduce claim recitations. In addition, even if a specific number of an introduced claim recitation is explicitly recited, such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, or A, B, and C together, etc.). Virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While various aspects and embodiments have been disclosed herein, other aspects and embodiments will be apparent to those of ordinary skill in the art. The various aspects and embodiments disclosed herein are for purposes of illustration and are not intended to be limiting.

The invention claimed is:

1. A system, comprising:
   a plurality of spaced posts that are disposed at least partially in a support medium;
   a limbed vehicle including a plurality of controllably movable limbs, the limbed vehicle configured to travel on at least two of the posts using the controllably movable limbs; and
   wherein the plurality of spaced posts do not form part of the limbed vehicle.

2. The system of claim 1, wherein at least one of the plurality of spaced posts is configured to controllably modify momentum of the limbed vehicle responsive to being contacted by the limbed vehicle.

3. The system of claim 2, wherein the at least one of the posts is configured to controllably modify a horizontal component or a vertical component of the momentum of the limbed vehicle.

4. The system of claim 1, wherein at least one of the plurality of spaced posts is configured to controllably modify momentum of at least one of the controllably movable limbs responsive to being contacted by the at least one of the controllably movable limbs.

5. The system of claim 1, wherein at least one of the plurality of spaced posts is configured to controllably impart a force to the limbed vehicle responsive to being contacted by the limbed vehicle.

6. The system of claim 1, further comprising:
   a plurality of support members, at least one of which is mechanically coupled to at least one of the posts.

7. The system of claim 6, wherein at least one of the support members is mechanically coupled to ground.

8. The system of claim 1, wherein at least one of the plurality of spaced posts includes a limb-interfacing mechanism.

9. The system of claim 8, wherein the limb-interfacing mechanism includes a magnetic mechanism.

10. The system of claim 8, wherein the limb-interfacing mechanism includes an electromagnet mechanism.

11. The system of claim 1, wherein at least one of the controllably movable limbs of the limbed vehicle includes a post-interfacing mechanism.

12. The system of claim 11, wherein the post-interfacing mechanism includes a magnetic mechanism.

13. The system of claim 11, wherein the post-interfacing mechanism includes an electromagnet mechanism.

14. The system of claim 1, wherein at least one of the plurality of spaced posts is configured to change configuration responsive to interacting with at least one of the controllably movable limbs of the limbed vehicle.

15. The system of claim 1, wherein at least one of the controllably movable limbs is configured to change configuration responsive to interacting with at least one of the posts.

16. The system of claim 1, wherein at least one of the plurality of spaced posts includes an elongated member disposed at least partially within ground.

17. The system of claim 1, wherein at least one of the plurality of spaced posts is mechanically coupled to the ground.

18. The system of claim 1, wherein at least one of the plurality of spaced posts is adjustable in length.

19. The system of claim 1, wherein the support medium includes a surface.

20. The system of claim 19, wherein the surface includes a substantially vertical surface.

21. The system of claim 19, wherein the surface includes a substantially horizontal surface.

22. The system of claim 19, wherein the surface includes an agriculture field.

23. The system of claim 22, wherein the limbed vehicle carries an agriculture tool.

24. The system of claim 1, wherein the limbed vehicle includes an operator interface configured to allow an operator to direct the operation thereof.

25. The system of claim 1, wherein the limbed vehicle is operable via a remote-control system.

26. The system of claim 1, wherein the limbed vehicle includes a robotic control system.

27. The system of claim 1, wherein the plurality of controllably movable limbs includes at least one limb configured to carry a payload.

28. The system of claim 1, wherein one of the controllably movable limbs carries a post-installation apparatus.

29. The system of claim 1, wherein one of the controllably movable limbs carries a support member installation apparatus.

30. A method, comprising:
    directing a limbed vehicle to be at least partially supported on at least one post of a plurality of spaced posts using at least one limb of the limbed vehicle, wherein the plurality of spaced posts are disposed at least partially in a support medium, and wherein the plurality of spaced posts do not form part of the limbed vehicle; and
    directing the limbed vehicle to travel onto at least one additional post of the plurality of spaced posts.

31. The method of claim 30, wherein directing the limbed vehicle to travel onto at least one additional post of the plurality of spaced posts further includes:
    directing the limbed vehicle to be at least partially supported on the at least one additional post using the at least one limb of the limbed vehicle; and
    directing the limbed vehicle to cease being at least partially supported by the at least one post.

32. The method of claim 30, further comprising:
    contacting the at least one post with the at least one limb to cause the at least one post to apply force to the limbed vehicle.

33. The method of claim 30, wherein directing a limbed vehicle to be at least partially supported on at least one post of a plurality of spaced posts using at least one limb of the limbed vehicle includes:
    directing the limbed vehicle to be partially supported on a first post of the plurality of spaced posts by a first limb of the limbed vehicle; and
    directing the limbed vehicle to be partially supported on a second post of the plurality of spaced posts by a second limb of the limbed vehicle.

34. The method of claim 30, wherein directing the limbed vehicle to travel onto at least one additional post of the plurality of spaced posts includes:
    directing a first limb of the limbed vehicle to move onto a first additional post of the plurality of spaced posts; and
    directing a second limb of the limbed vehicle to move onto a second additional post of the plurality of spaced posts.

35. The method of claim 30, further comprising:
    causing the at least one limb to at least partially physically interface with the at least one additional post.

36. The method of claim 35, wherein causing the at least one limb to at least partially physically interface with the at least one additional post includes:
    causing the at least one limb to be magnetically attracted to the at least one additional post.

37. The method of claim 36, wherein causing the at least one limb to at least partially physically interface with the at least one additional post includes:
    causing a post-interfacing mechanism of the at least one limb to at least partially interlock with a limb-interfacing mechanism of the at least one additional post.

38. The method of claim 30, further comprising:
    directing the limbed vehicle to service an agriculture field including the plurality of spaced posts distributed therewithin.

39. The method of claim 30, further comprising:
    prior to directing the limbed vehicle to travel onto the at least one additional post of the plurality of spaced posts, directing the limbed vehicle to deploy the at least one additional post while the limbed vehicle is at least partially supported on the at least one post.

40. The method of claim 39, wherein directing the limbed vehicle to deploy the at least one additional post while the limbed vehicle is at least partially supported on the at least one post includes:
    directing the limbed vehicle to take the at least one additional post from a supply of posts carried by the limbed vehicle.

41. The method of claim 30, wherein the at least one post and the at least one additional post project outwardly from a substantially vertical surface.

42. The method of claim 30, wherein the at least one post and the at least one additional post project outwardly from a substantially horizontal surface.

43. The method of claim 30, further comprising:
    directing the limbed vehicle to mechanically interconnect the at least one post and the at least one additional post.

* * * * *